(12) United States Patent
Chang et al.

(10) Patent No.: US 8,761,515 B2
(45) Date of Patent: Jun. 24, 2014

(54) ELECTRONIC DEVICE AND METHOD FOR CREATING MEASUREMENT CODES

(75) Inventors: Chih-Kuang Chang, New Taipei (TW); Xin-Yuan Wu, Shenzhen (CN); Zheng-Zhi Zhang, Shenzhen (CN); Jin-Gang Rao, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 21 days.

(21) Appl. No.: 13/537,076

(22) Filed: Jun. 29, 2012

(65) Prior Publication Data

US 2013/0094761 A1 Apr. 18, 2013

(30) Foreign Application Priority Data

Oct. 13, 2011 (CN) .......................... 2011 1 0309604

(51) Int. Cl.
 *G06K 9/46* (2006.01)
 *G06K 9/66* (2006.01)
(52) U.S. Cl.
 USPC ........................... 382/190; 382/305; 707/828

(58) Field of Classification Search
 USPC ............ 382/190, 305; 707/821, 828; 711/114
 See application file for complete search history.

(56) References Cited

U.S. PATENT DOCUMENTS

| 7,886,010 | B1 * | 2/2011 | Shankar ........................ 709/206 |
| 8,046,392 | B2 * | 10/2011 | Ueoka et al. .................. 707/828 |
| 2002/0035625 | A1 * | 3/2002 | Tanaka .......................... 709/223 |
| 2013/0094761 | A1 * | 4/2013 | Chang et al. .................. 382/190 |

* cited by examiner

*Primary Examiner* — Gregory M Desire
(74) *Attorney, Agent, or Firm* — Novak Druce Connolly Bove + Quigg LLP (57) ABSTRACT

A method for creating measurement codes automatically using an electronic device. In the method, a directory tree is created to display a plurality of feature elements. A selected feature element in the directory tree is determined; and output axes of the selected feature element are determined, according to an attribute type and a measurement type of the selected feature element. A marked number of the selected feature element is received; and a reference value, an upper tolerance, and a lower tolerance of the selected feature element are obtained. Measurement codes of the selected feature element are created according to the above-described obtained information, and the measurement codes are stored in a storage device of the electronic device.

20 Claims, 8 Drawing Sheets

```
[Location]
Number = 1
Point:X,Y,Z
Line:X,Y,Z,AX,AY,AZ,S
Plane:X,Y,Z,F,CP
Circle:X,Y,Z,R,D,C
Cylinder:X,Y,Z
Cone:X,Y,Z
Sphere:X,Y,Z
```

2 =DIMENSION/LOCATION,X,S1,35.0000,35.000000,0.050000,-0.050000

3 =DIMENSION/LOCATION,Y,S1,7.0000,7.000000,0.130000,-0.130000

4 =DIMENSION/LOCATION,Z,S1,10.000,10.000000,0.250000,-0.250000

ELECTRONIC DEVICE AND METHOD FOR CREATING MEASUREMENT CODES

BACKGROUND

1. Technical Field

Embodiments of the present disclosure relate to measurement technology, and particularly to an electronic device for creating measurement codes and a method for creating measurement codes using the electronic device.

2. Description of Related Art

Measurement is an important phase in many areas of manufacturing and is closely related to product quality. Point cloud obtaining devices have been used to obtain a point cloud of a manufactured object. The point cloud is obtained by scanning a large number of points on a surface of the object, processing the data in the point cloud, and subsequently extracting boundary elements including boundary points and boundary characteristics of the object. Thereby, an image of the profile of the object is formed.

Various image measurement systems have been used to measure a manufactured object by analyzing the image of the profile of the object obtained by a point cloud obtaining device. For example, feature elements such as lines or points of the object are analyzed. However, many image measuring methods cannot automatically create measurement codes used in measuring the object. Therefore, a more efficient means for creating the measurement codes of an object to be measured is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
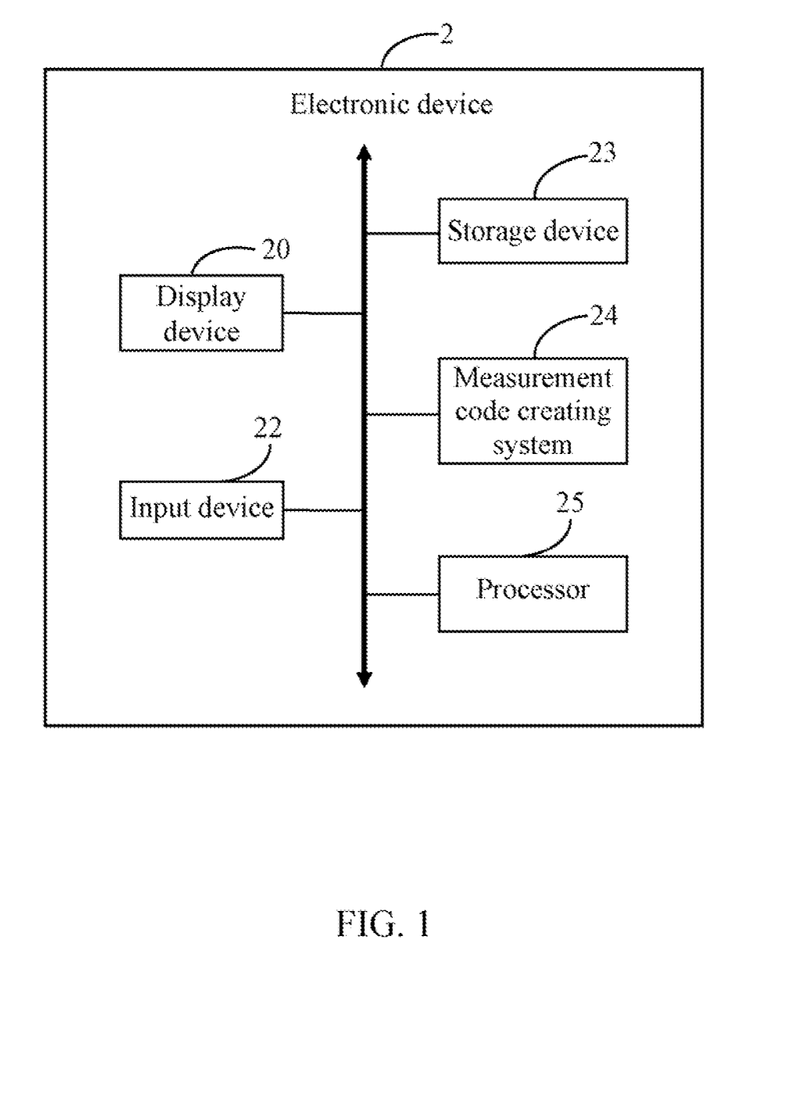
FIG. 1 is a block diagram of one embodiment of an electronic device including a measurement code creating system.

FIG. 1 is a block diagram of one embodiment of an electronic device 2 including a measurement code creating system 24. In the embodiment, the electronic device 2 further includes a display device 20, an input device 22, a storage device (or memory) 23, and at least one processor 25. It should be understood that FIG. 1 illustrates only one example of the electronic device 2, which may include more or fewer components than illustrated or have a different configuration of the various components in other embodiments. The electronic device 2 may be a computer, a server, or any other suitable computing device.

The display device 20 may be a liquid crystal display (LCD) or a cathode ray tube (CRT) display used to display measurement codes of an object to be measured. The input device 22 may be a mouse or a keyboard used to input computer readable data. The storage device 23 may store the measurement codes of the object and other measurement data of the object.

The measurement code creating system 24 is used to obtain measurement types, output axes and tolerance ranges of various types of feature elements of an object, create measurement codes in relation to all the feature elements, and display the measurement codes on the display device 20. In one embodiment, a "feature element" may be a line, a plane, a circle, a cylinder, or a sphere, but the disclosure is not limited thereto.

In one embodiment, the output axes of a feature element are specified axes (e.g., X-axis and Y-axis) which are used to output results of measurements (hereinafter referred to as "measured results") of the feature element. For example, if the output axis of the feature element is the X-axis, the measured results of the feature element along the X-axis are outputted. In one embodiment, the measured results may be a length of a feature element along the X-axis or along the Y-axis. The tolerance range may be preset as a range of numbers, for example, [−0.5, +0.5].

The measurement code creating system 24 may include computerized instructions in the form of one or more programs that are executed by the at least one processor 25 and stored in the storage device 23. A detailed description of the measurement code creating system 24 will be given in the following paragraphs.

Figure 2:
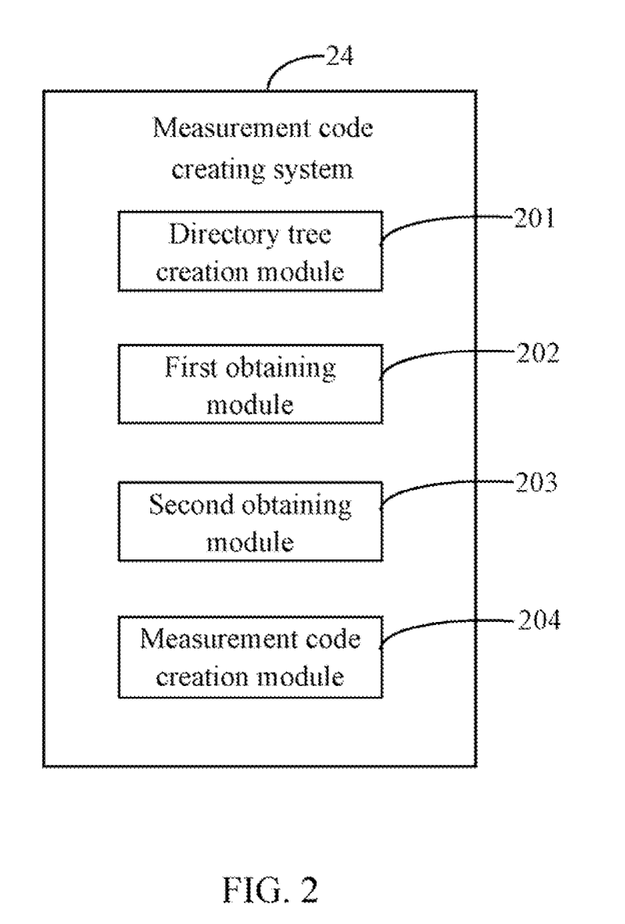
FIG. 2 is a schematic diagram of function modules of the measurement code creating system of the electronic device of FIG. 1.

FIG. 2 is a schematic diagram of function modules of the measurement code creating system 24 of the electronic device 2. In one embodiment, the measurement code creating system 24 may include one or more modules, for example, a directory tree creation module 201, a first obtaining module 202, a second obtaining module 203, and a measurement code creation module 204. In general, the word "module," as used herein, refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable mediums include compact discs (CDs), digital versatile discs (DVDs), Blu-Ray discs, Flash memory, and hard disk drives.

Figure 3:
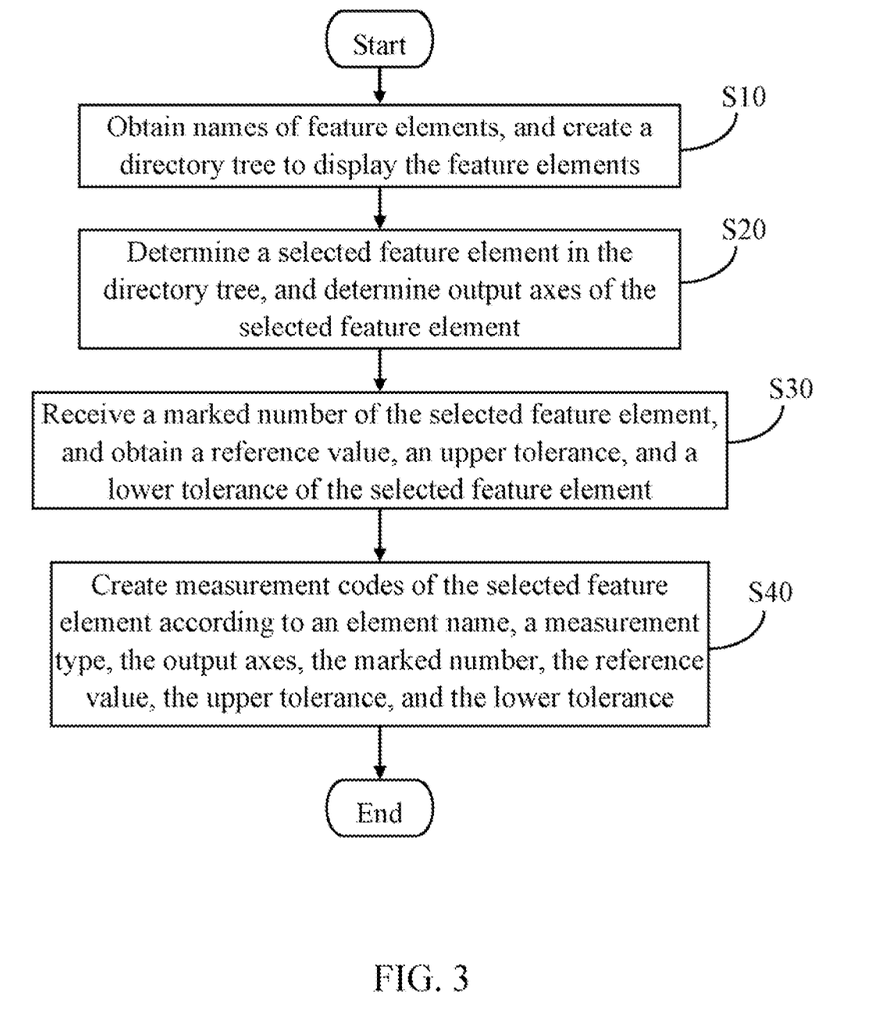
FIG. 3 is a flowchart of one embodiment of a method for creating measurement codes of an object automatically using the electronic device of FIG. 1.

FIG. 3 is a flowchart of one embodiment of a method for creating measurement codes of an object automatically using the electronic device 2. Depending on the embodiment, additional steps may be added, others removed, and the ordering of the steps may be changed.

In step S10, the directory tree creation module 201 obtains element names of a plurality of features elements of an object, and creates a directory tree for displaying the feature elements. The feature elements are obtained from an image of the object and stored in the storage device 23 of the electronic device 2. In one embodiment, the image of the object may be a two dimensional (2D) image, such as a computer aided design (CAD) image. A detailed description is as follows.

Figure 4:
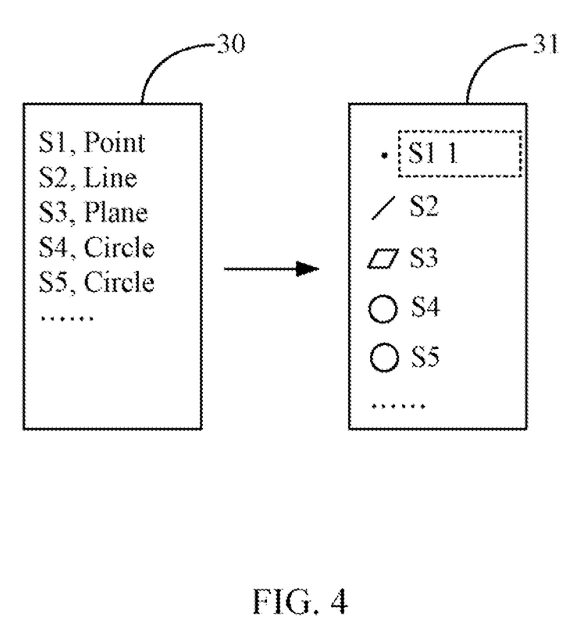
FIG. 4 is an exemplary schematic diagram for creating a directory tree displaying a plurality of feature elements of an image of an object.

If a listing file 30 of the feature element is stored in the storage device 23, the directory tree creation module 201 obtains all of the feature elements in the listing file 30, and creates a directory tree 31 for displaying all the feature elements in the listing file 30. As shown in FIG. 4, "S1-S5" represent element names of the feature elements. The attribute type of the first element "S1" is a point, the attribute type of the second element "S2" is a line, the attribute type of the third element "S3" is a plane, and the attribute type of each of the fourth element "S4" and the fifth element "S5" is a circle.

If the listing file 30 is not stored in the storage device 23, the directory tree creation module 201 receives inputted feature elements in response to receiving user inputs, creates the directory tree 31 for displaying the inputted feature elements in the listing file 31, and stores the inputted feature elements in the listing file 30. In one embodiment, certain keywords are preset to record different types of the feature elements. For example, "PT" represents the point, "LN" represents the line, "PL" represents the plane, and "CR" represents the circle. The user may input "PT1," "LN2," "PL3," "CR4," "CR5," and so on, to create the directory tree 31 as shown in FIG. 4.

In step S20, the first obtaining module 202 determines a selected feature element in the directory tree 31 in response to receiving a user selection, and determines output axes of the selected feature element according to an attribute type of the selected feature element and a measurement type of the selected feature element.

In one embodiment, the attribute type of the feature element may include, but is not limited to, a point type, a line type, a plane type, and a circle type. The measurement type of the feature element may include, but is not limited to, a distance between two adjacent feature elements, an angle between two adjacent feature elements, and a location of the feature element. The location of the feature element may be coordinates of a center of the feature element.

Figure 5:
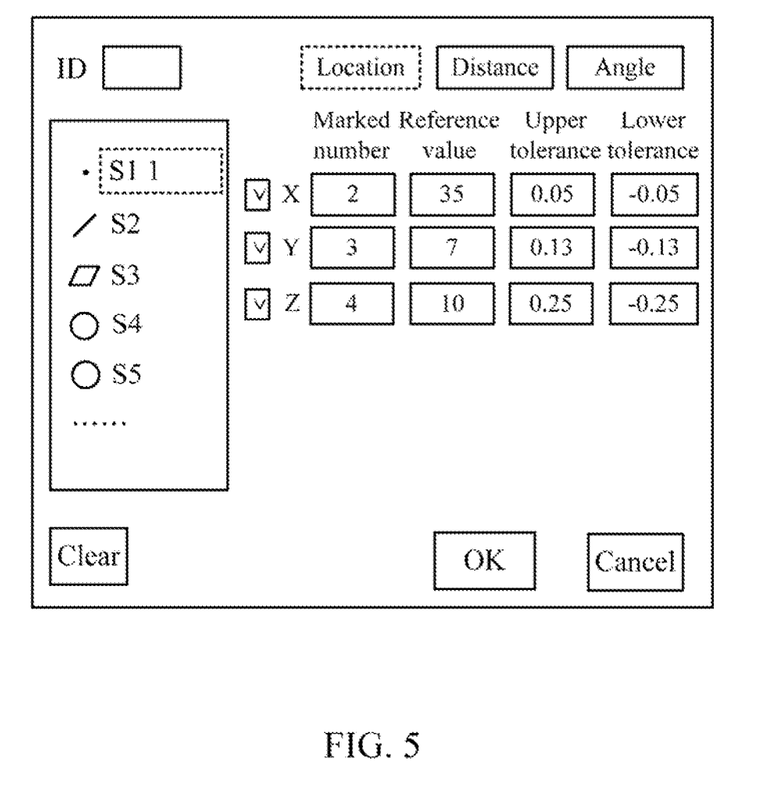
FIG. 5 is an exemplary schematic diagram of a user operation interface.
Figure 6:
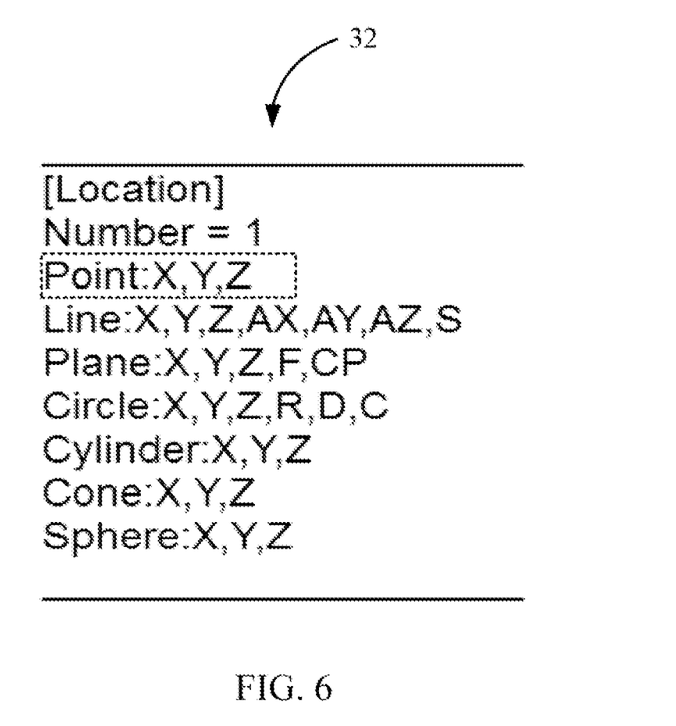
FIG. 6 is an exemplary schematic diagram of a measurement template file of a selected feature element.

For example, as shown in FIG. 5, the user may select the first element "S1," and select the measurement type of "S1" as the "Location." The first obtaining module 202 obtains a measurement template file 32 (as shown in FIG. 6) of the selected feature element "S1" according to the measurement type of the selected feature element "S1," and obtains the output axes of the selected feature element "S1" from the measurement template file 32 according to an attribute type of the selected feature element "S1." As shown in FIG. 6, the attribute type of the selected feature element "S1" is the "Point," and the output axes of the selected feature element "S1" are an X-axis, a Y-axis, and a Z-axis (referring to the broken lines).

In step S30, the second obtaining module 203 receives a marked number of the selected feature element in response to receiving user inputs, and obtains a reference value, an upper tolerance, and a lower tolerance of the selected feature element. In one embodiment, the upper tolerance is the maximum limit of the tolerance range, and the lower tolerance is the minimum limit of the tolerance range. The marked number is a sequential or ordinal number used to identify a position of a feature element. For example, the marked number is positioned near the feature element in the image of the object, so that a user can easily find the feature element corresponding to the marked number. A detailed description of step S30 is as follows.

Figure 7:
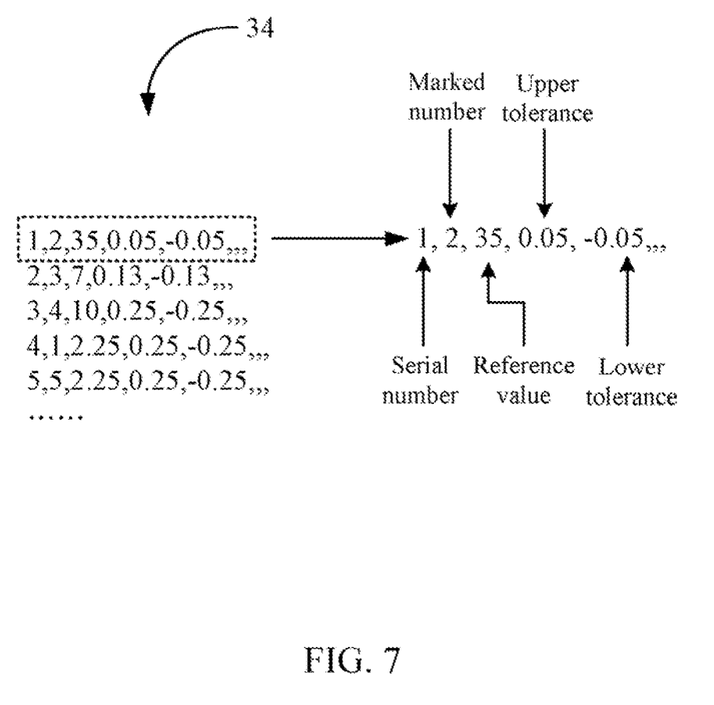
FIG. 7 is an exemplary schematic diagram of a measurement program file of the selected feature element.

The second obtaining module 203 obtains a measurement program file 34 (as shown in FIG. 7) of the selected feature element from the storage device 23. The second obtaining module 203 determines measurement information corresponding to the marked number of the selected feature element in the measurement program file 34, and retrieves the reference value, the upper tolerance, and the lower tolerance of the selected feature element from the determined measurement information. For example, as shown in FIG. 7, if the marked number is "2," the reference value of the selected feature element is 35, the upper tolerance is "+0.05," and the lower tolerance is "−0.05." The tolerance range of the selected feature element as determined by the lower tolerance and the upper tolerance is [−0.05, +0.05].

If the measurement program file 34 does not include the marked number, the second obtaining module 203 outputs a prompt on the display device 20 to ask the user to input a new marked number. If, after the prompt, the measurement program file 34 still does not include the marked number, the prompt is repeated a preset number of times (e.g. three).

Figure 8:
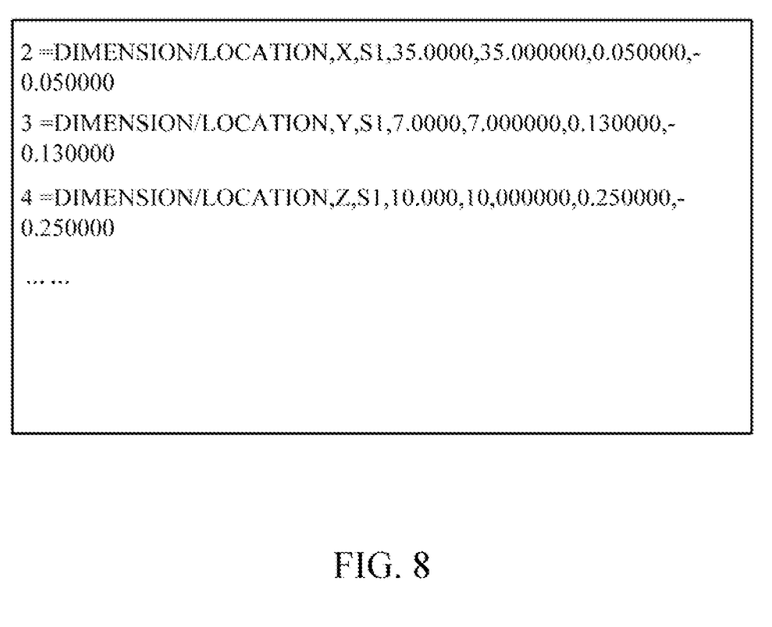
FIG. 8 is an exemplary schematic diagram of measurement codes of the selected feature element.

In step S40, the measurement code creation module 204 creates measurement codes of the selected feature element according to the element name, the measurement type, the output axes, the marked number, the reference value, the upper tolerance, and the lower tolerance, displays the measurement codes on the display device 20 (as shown in FIG. 8), and stores the measurement codes in the storage device 23.

In one embodiment, the user may select certain output axes as the parameter(s) to output the measured results of the selected feature element. For example, as shown in FIG. 5, the user may select the X-axis and the Y-axis as the output axes, or select the X-axis and the Z-axis as the output axes.

An example of a format of the measurement codes of the selected feature element is as follows:
DimensionNo=DIMENSION/OperateType,DimensionType,ElementName,Actual, Normal,UpperTol,LowTol,
where "DimensionNo" represents the marked number, "OperateType" represents the measurement type, "DimensionType" represents the output axes, "ElementName" represents the element name, "Actual" represents the measured results, "Normal" represents the "reference value," "UpperTol" represents the upper tolerance, and "LowTol" represents the lower tolerance.

It should be emphasized that the above-described various embodiments are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and may be protected by the following claims.

What is claimed is:

1. A computerized method for creating measurement codes using an electronic device comprising a processor, the method being performed by execution of computerized instructions by the processor of the electronic device, the method comprising:

creating a directory tree for displaying a plurality of feature elements according to element names of the feature elements, the feature elements being obtained from a storage device of the electronic device;

determining a selected feature element in the directory tree, and determining output axes of the selected feature element according to an attribute type and a measurement type of the selected feature element;

receiving a marked number of the selected feature element, and obtaining a reference value, an upper tolerance, and a lower tolerance of the selected feature element; and creating measurement codes of the selected feature element according to the element name, the measurement type, the output axes, the marked number, the reference value, the upper tolerance, and the lower tolerance, displaying the measurement codes on a display device of the electronic device, and storing the measurement codes in the storage device.

2. The method according to claim 1, wherein the attribute type of the selected feature element is selected from the group consisting of a point type, a line type, a plane type, and a circle type.

3. The method according to claim 1, wherein the measurement type of each feature element is selected from the group consisting of a distance between two adjacent feature elements, an angle between two adjacent feature elements, and a location of each feature element.

4. The method according to claim 1, wherein the directory tree is created by:
obtaining a listing file of the feature elements from the storage device storing the listing file, or receiving inputted feature elements in response to receiving user inputs; and
creating the directory tree for displaying the feature elements in the listing file or the inputted feature elements.

5. The method according to claim 1, wherein the output axes of the selected feature element are determined by:
obtaining a measurement template file of the selected feature element according to the measurement type of the selected feature element; and
obtaining the output axes of the selected feature element from the measurement template file according to the attribute type of the selected feature element.

6. The method according to claim 1, wherein the reference value, the upper tolerance, and the lower tolerance of the selected feature element are obtained by:
obtaining a measurement program file of the selected feature element from the storage device; and
determining measurement information corresponding to the marked number of the selected feature element in the measurement program file, and retrieving the reference value, the upper tolerance, and the lower tolerance of the selected feature element from the determined measurement information.

7. The method according to claim 1, wherein the output axes of the selected feature element are specified axes for outputting results of measurements of the selected feature element.

8. An electronic device, comprising:
a storage device;
at least one processor; and
one or more modules that are stored in the storage device and executed by the at least one processor, the one or more modules comprising:
a directory tree creation module that creates a directory tree for displaying a plurality of feature elements according to element names of the feature elements, the feature elements being obtained from the storage device;
a first obtaining module that determines a selected feature element in the directory tree, and determines output axes of the selected feature element according to an attribute type and a measurement type of the selected feature element;
a second obtaining module that receives a marked number of the selected feature element, and obtains a reference value, an upper tolerance, and a lower tolerance of the selected feature element; and
a measurement code creation module that creates measurement codes of the selected feature element according to the element name, the measurement type, the output axes, the marked number, the reference value, the upper tolerance, and the lower tolerance, and stores the measurement codes in the storage device.

9. The electronic device according to claim 8, wherein the attribute type of the selected feature element is selected from the group consisting of a point type, a line type, a plane type, and a circle type.

10. The electronic device according to claim 8, wherein the measurement type of each feature element is selected from the group consisting of a distance between two adjacent feature elements, an angle between two adjacent feature elements, and a location of each feature element.

11. The electronic device according to claim 8, wherein the directory tree creation module creates the directory tree by:
obtaining a listing file of the feature elements from the storage device storing the listing file, or receiving inputted feature elements in response to receiving user inputs; and
creating the directory tree for displaying the feature elements in the listing file or the inputted feature elements.

12. The electronic device according to claim 8, wherein the first obtaining module determines the output axes of the selected feature element by:
obtaining a measurement template file of the selected feature element according to the measurement type of the selected feature element; and
obtaining the output axes of the selected feature element from the measurement template file according to the attribute type of the selected feature element.

13. The electronic device according to claim 8, wherein the second obtaining module obtains the reference value, the upper tolerance, and the lower tolerance of the selected feature element by:
obtaining a measurement program file of the selected feature element from the storage device; and
determining measurement information corresponding to the marked number of the selected feature element in the measurement program file, and retrieving the reference value, the upper tolerance, and the lower tolerance of the selected feature element from the determined measurement information.

14. The electronic device according to claim 8, wherein the output axes of the selected feature element are specified axes for outputting results of measurements of the selected feature element.

15. A non-transitory storage medium having stored thereon instructions that, when executed by a processor of an electronic device, causes the electronic device to perform a method for creating measurement codes, the method comprising:
creating a directory tree for displaying a plurality of feature elements according to element names of the feature elements, the feature elements being obtained from a storage device of the electronic device;
determining a selected feature element in the directory tree, and determining output axes of the selected feature element according to an attribute type and a measurement type of the selected feature element;
receiving a marked number of the selected feature element, and obtaining a reference value, an upper tolerance, and a lower tolerance of the selected feature element; and creating measurement codes of the selected feature element according to the element name, the measurement type, the output axes, the marked number, the reference value, the upper tolerance, and the lower tolerance, and storing the measurement codes in the storage device.

16. The non-transitory storage medium according to claim 15, wherein the attribute type of the selected feature element is selected from the group consisting of a point type, a line type, a plane type, and a circle type.

17. The non-transitory storage medium according to claim 15, wherein the measurement type of each feature element is selected from the group consisting of a distance between two adjacent feature elements, an angle between two adjacent feature elements, and a location of each feature element.

18. The non-transitory storage medium according to claim 15, wherein the directory tree is created by:
   obtaining a listing file of the feature elements from the storage device storing the listing file, or receiving inputted feature elements in response to receiving user inputs; and
   creating the directory tree for displaying the feature elements in the listing file or the inputted feature elements.

19. The non-transitory storage medium according to claim 15, wherein the output axes of the selected feature element are determined by:
   obtaining a measurement template file of the selected feature element according to the measurement type of the selected feature element; and
   obtaining the output axes of the selected feature element from the measurement template file according to the attribute type of the selected feature element.

20. The non-transitory storage medium according to claim 15, wherein the reference value, the upper tolerance, and the lower tolerance of the selected feature element are obtained by:
   obtaining a measurement program file of the selected feature element from the storage device; and
   determining measurement information corresponding to the marked number of the selected feature element in the measurement program file, and retrieving the reference value, the upper tolerance, and the lower tolerance of the selected feature element from the determined measurement information.

* * * * *